(12) United States Patent
Fleury et al.

(10) Patent No.: US 7,439,851 B2
(45) Date of Patent: Oct. 21, 2008

(54) CAB RECEPTACLE WITH INDICATOR LIGHT

(75) Inventors: Philip J. Fleury, St. Francois Xavier (CA); Claudio Zubin, Winnipeg (CA); Sean Marleau, Winnipeg (CA)

(73) Assignee: Phillips & Temro Industries Inc., Eden Prairie, MN (US)

( * ) Notice: Subject to any disclaimer, the term of this patent is extended or adjusted under 35 U.S.C. 154(b) by 326 days.

(21) Appl. No.: 11/305,743

(22) Filed: Dec. 16, 2005

(65) Prior Publication Data

US 2007/0139177 A1    Jun. 21, 2007

(51) Int. Cl.
*B60Q 1/00* (2006.01)
*G08B 21/00* (2006.01)

(52) U.S. Cl. ............. 340/438; 340/656; 340/657; 340/693.1; 320/109; 320/111; 307/9.1; 307/150; 439/34; 439/36

(58) Field of Classification Search .................. 340/438
See application file for complete search history.

(56) References Cited

U.S. PATENT DOCUMENTS

| | | | |
|---|---|---|---|
| 3,858,140 A | 12/1974 | Hancock | |
| 3,898,547 A * | 8/1975 | Poole | ............. 320/109 |
| 4,538,134 A | 8/1985 | Carey | |
| 4,570,145 A | 2/1986 | Carey | |
| 4,699,445 A | 10/1987 | Porta et al. | |
| 5,088,835 A | 2/1992 | Shigezawa et al. | |
| 5,181,866 A | 1/1993 | Jerome et al. | |
| 5,188,542 A | 2/1993 | Ballman | |
| 5,320,563 A | 6/1994 | Liao | |
| 5,384,559 A | 1/1995 | Shamir | |
| 5,538,439 A | 7/1996 | Fell et al. | |
| 5,590,010 A | 12/1996 | Ceola et al. | |
| 5,742,464 A | 4/1998 | Ceola et al. | |
| 5,777,868 A | 7/1998 | Gibboney, Jr. | |
| 5,885,098 A | 3/1999 | Witkowski | |
| 5,930,097 A | 7/1999 | Ceola et al. | |
| 5,937,140 A | 8/1999 | Leonard et al. | |
| 6,036,530 A | 3/2000 | Edwards et al. | |
| 6,039,602 A | 3/2000 | Witkowski et al. | |
| 6,072,152 A | 6/2000 | Landry | |
| 6,171,118 B1 | 1/2001 | Witkowski et al. | |
| 6,179,654 B1 | 1/2001 | Witkowski et al. | |
| 6,257,923 B1 | 7/2001 | Stone et al. | |
| 6,377,029 B1 * | 4/2002 | Krieger et al. | ............. 320/139 |
| 6,448,863 B1 | 9/2002 | Ogawa et al. | |
| 6,644,987 B2 | 11/2003 | Meleck | |

FOREIGN PATENT DOCUMENTS

CA    2135948    5/1996

* cited by examiner

*Primary Examiner*—Donnie L Crosland
(74) *Attorney, Agent, or Firm*—Harness, Dickey & Pierce, P.L.C.

(57) ABSTRACT

An electrical indicator system and a method for operating the system includes a plug adapted to be electrically coupled to a power source remote from the vehicle and an indicator adapted to be mounted to the vehicle at a visible location. The indicator is operable to provide a first visual indication when electrical power is present at the plug. The indicator provides a second visual indication, different from the first visual indication, when current is flowing through the plug.

33 Claims, 10 Drawing Sheets

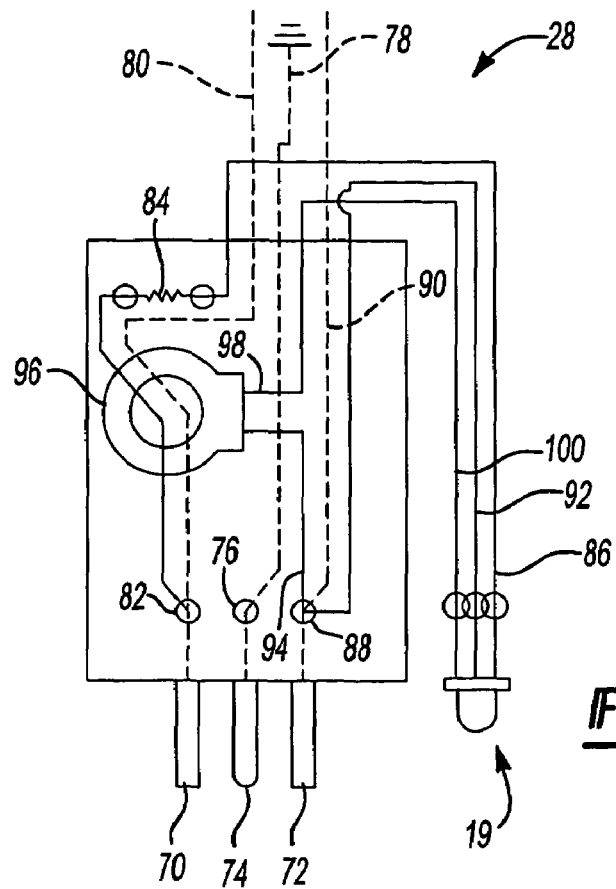
_Fig-6_
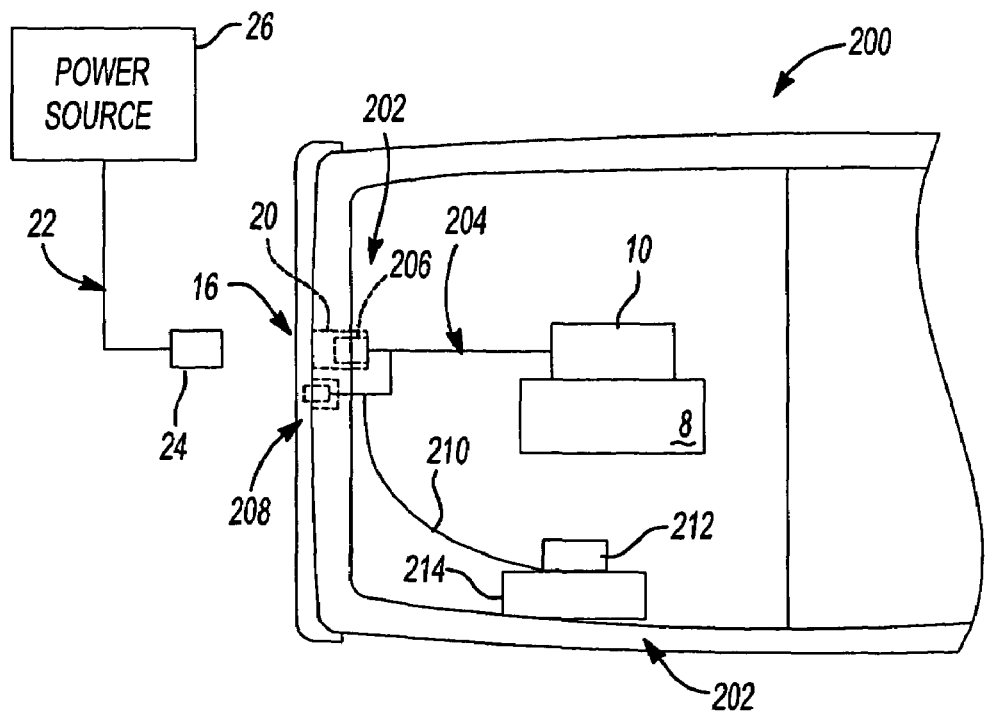
_Fig-7_

CAB RECEPTACLE WITH INDICATOR LIGHT

BACKGROUND AND SUMMARY OF THE INVENTION

The present invention relates generally to electrically powered accessories for motor vehicles and, more particularly, to an electrical indicator system for motor vehicles.

Various electrically powered devices are designed for use with vehicles including automobiles, light-duty trucks and heavy-duty vehicles. These devices, including cold weather starting devices such as radiant heaters, engine block heaters, fluid heaters, battery warmers, and the like, are generally fixed to the automobile and operationally connected to an appropriate component of the vehicle engine. The operation of these devices generally occurs upon connection to a power source external to the vehicle. As such, a factor in the sales and use of these devices is the simplicity with which the device can be electrically connected to the power source. To address this concern, cord sets have been developed that include a receptacle connected to the vehicle body for mounting an electrical cord that is connected to the electrically powered device. The power cords of the cord sets terminate at a male or female plug that is coupled to the receptacle. A counterpart plug external to the vehicle is selectively coupled to the receptacle to allow electrical connection of the device to the power source.

Cord sets for selectively electrically connecting an electrically powered automobile accessory to a power source are commercially available for use with heavy-duty vehicles today. Specifically, the assignee of the present invention and others have manufactured cord set receptacles that are generally cylindrical in shape and include a cylindrical housing open at one end to accommodate a male plug and normally closed at an opposite end by a spring biased cover.

Despite the satisfactory application of the above-described receptacle and cord set for use with heavy-duty vehicles in certain automotive applications, a need exists for an improved device. Specifically, when a vehicle operator connects the plug end of a power source to the plug mounted within the receptacle, it is unknown if power is present at the plug. Power sources located at truck stops, rest stations or vehicle service stations do not always function properly. The presently available cord sets provide no visual indication regarding the presence of electrical power. Furthermore, presently available receptacles and cord sets do not provide the vehicle operator with an indication that current is flowing through the receptacle during operation of the vehicle accessories. It would be particularly advantageous to the vehicle operator to know if the cold weather starting device is operational and receiving current immediately after connecting the external power source plug to the receptacle. External indicia of these electrical operating conditions would greatly assist the operator by not requiring the operator to open the hood to inspect the engine compartment or enter the vehicle to view the instrument panel.

Accordingly, the present invention relates to an electrical indicator system for use with an accessory mounted to a vehicle. The electrical indicator system includes a plug adapted to be electrically coupled to a power source remote from the vehicle and an indicator adapted to be mounted to the vehicle at a visible location. The indicator is operable to provide a first visual indication when electrical power is present at the plug. The indicator provides a second visual indication, different from the first visual indication, when current is flowing through the plug.

Furthermore, a method of indicating the external power availability and usage to an operator of a vehicle having an electrical accessory mounted to the vehicle is disclosed. The vehicle is equipped with a cord set having a first end electrically connected to the accessory and a second bifurcated end having a plug coupled to an externally accessible receptacle in an indicator. The method includes electrically coupling an external power source to the plug and emitting a first visual signal to indicate that power is being supplied to the plug. Additionally, the method includes selectively operating the accessory and emitting a second visual signal during operation of the accessory to indicate that power is being supplied to the accessory.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is an electrical schematic relating to the electrical indicator system;

FIG. 7 is a schematic illustration of an alternate embodiment vehicle and electrical indicator system;

DETAILED DESCRIPTION OF THE PREFERRED EMBODIMENTS

The following description of the preferred embodiment(s) is merely exemplary in nature and is in no way intended to limit the invention, its application, or uses.

Figure 1:
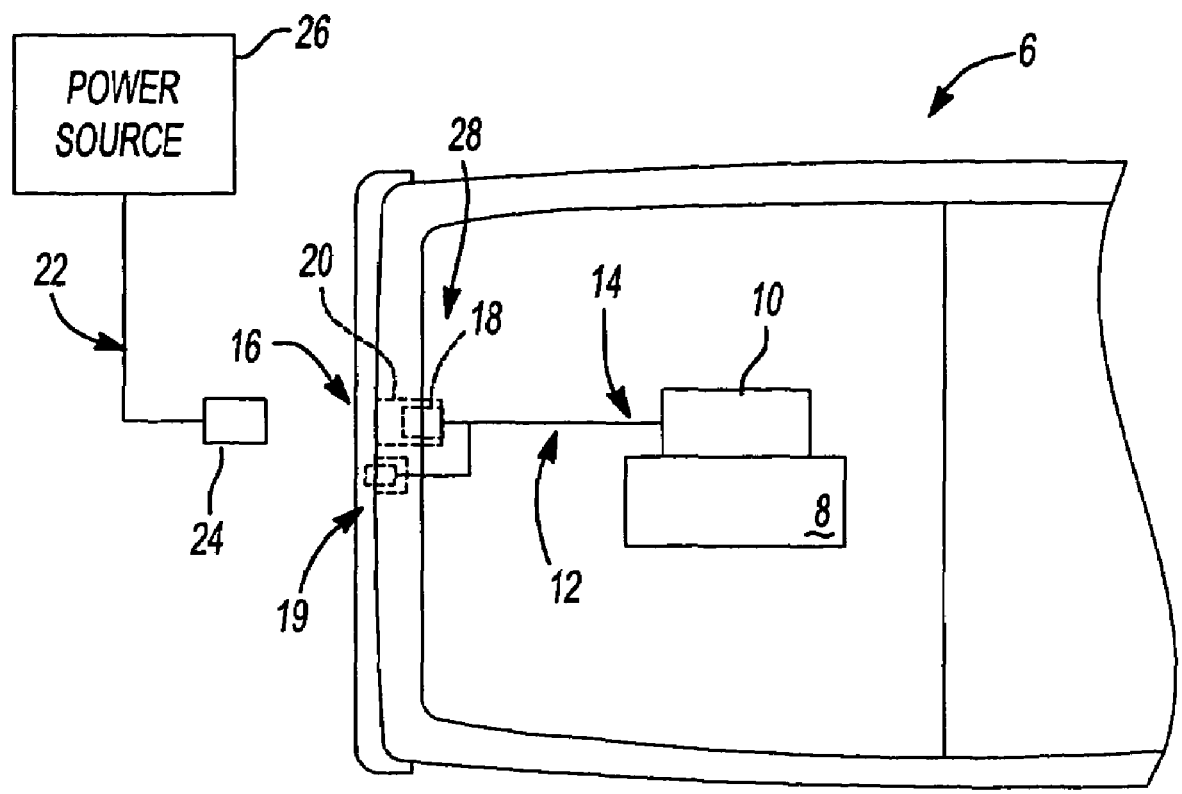
FIG. 1 is a schematic illustration of an exemplary vehicle equipped with an electrical indicator system.
Figure 2:
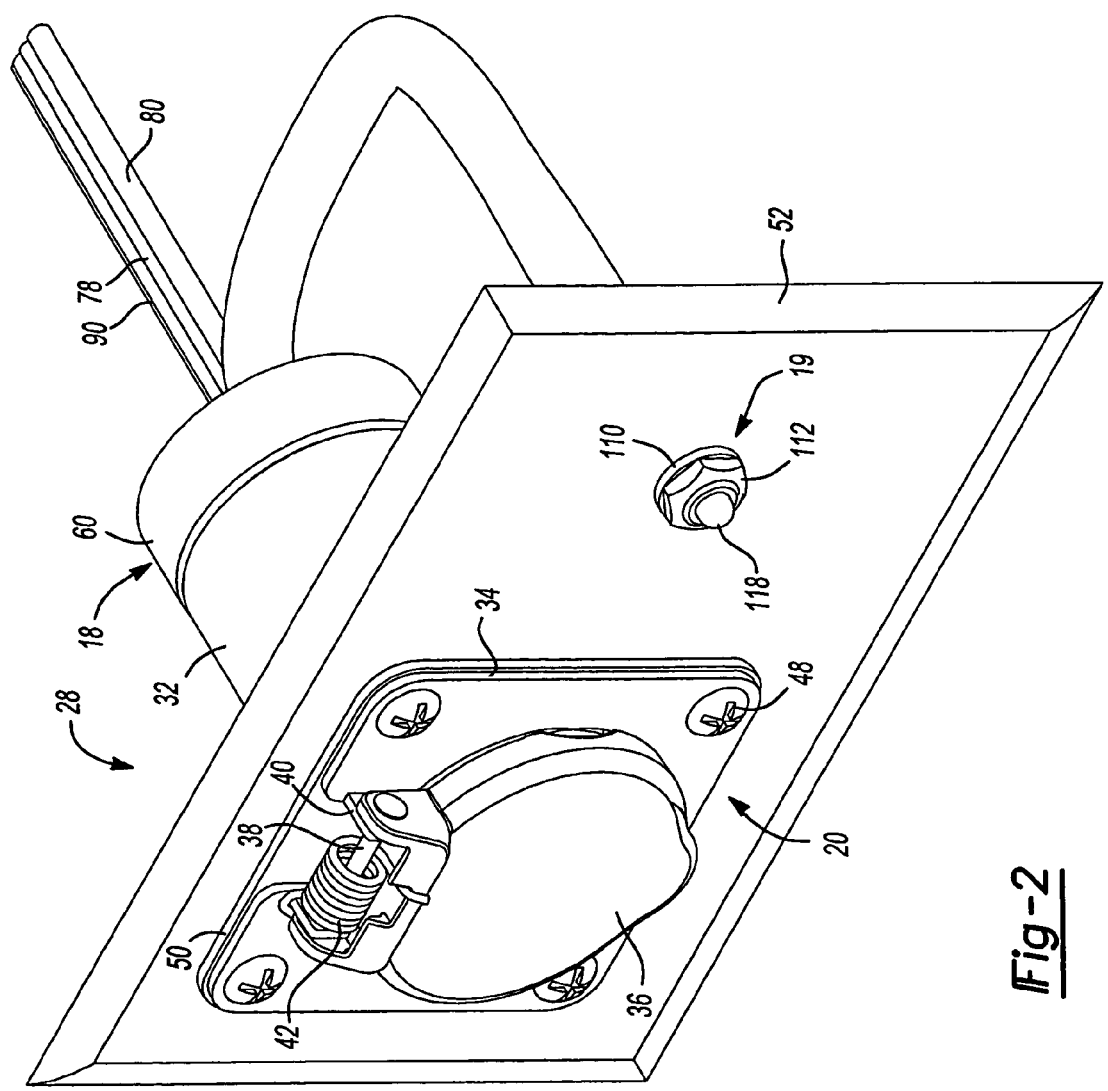
FIG. 2 is a perspective view of an electrical indicator system coupled to an exemplary vehicle.
Figure 3:
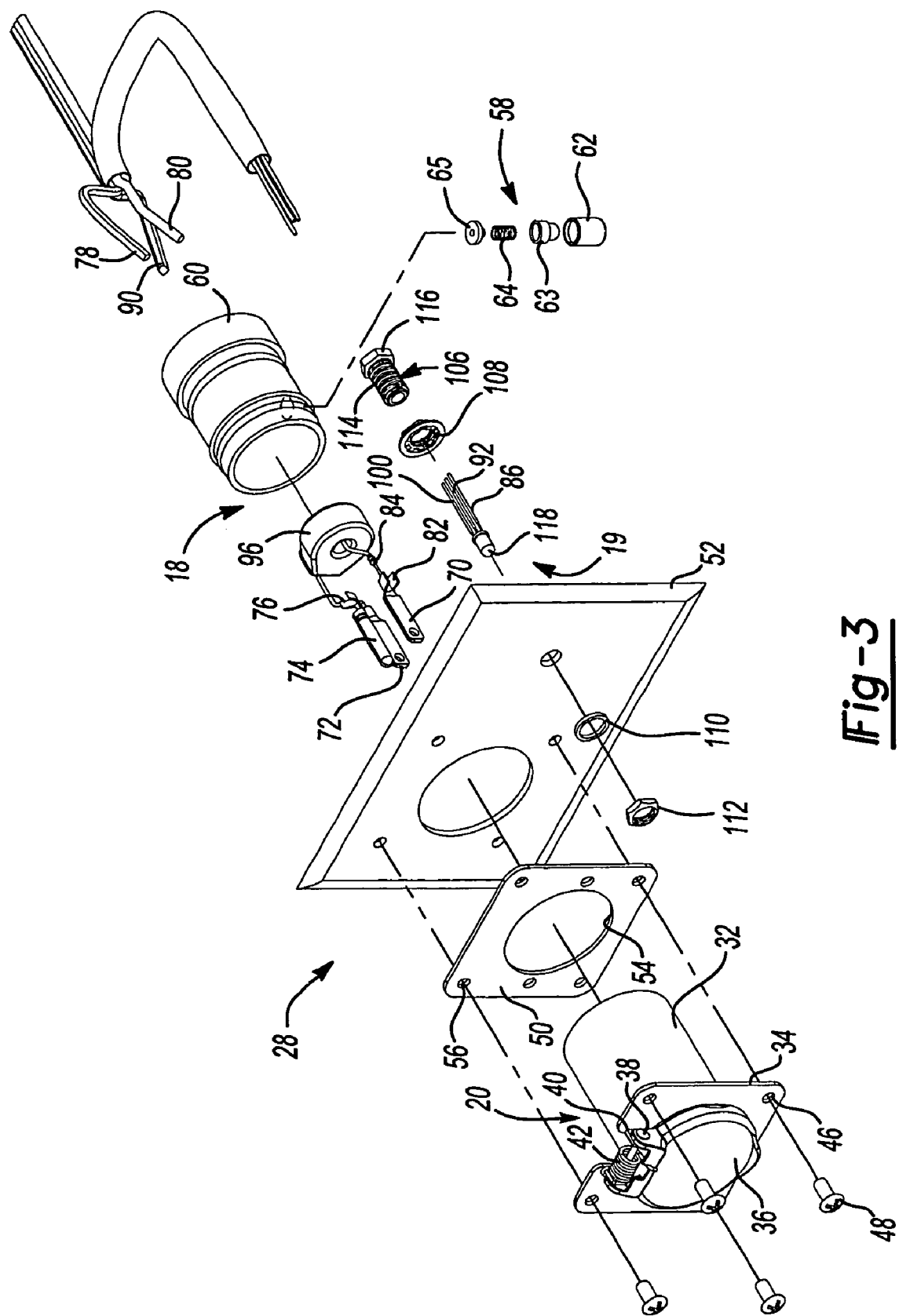
FIG. 3 is an exploded perspective view of the electrical indicator system.
Figure 4:
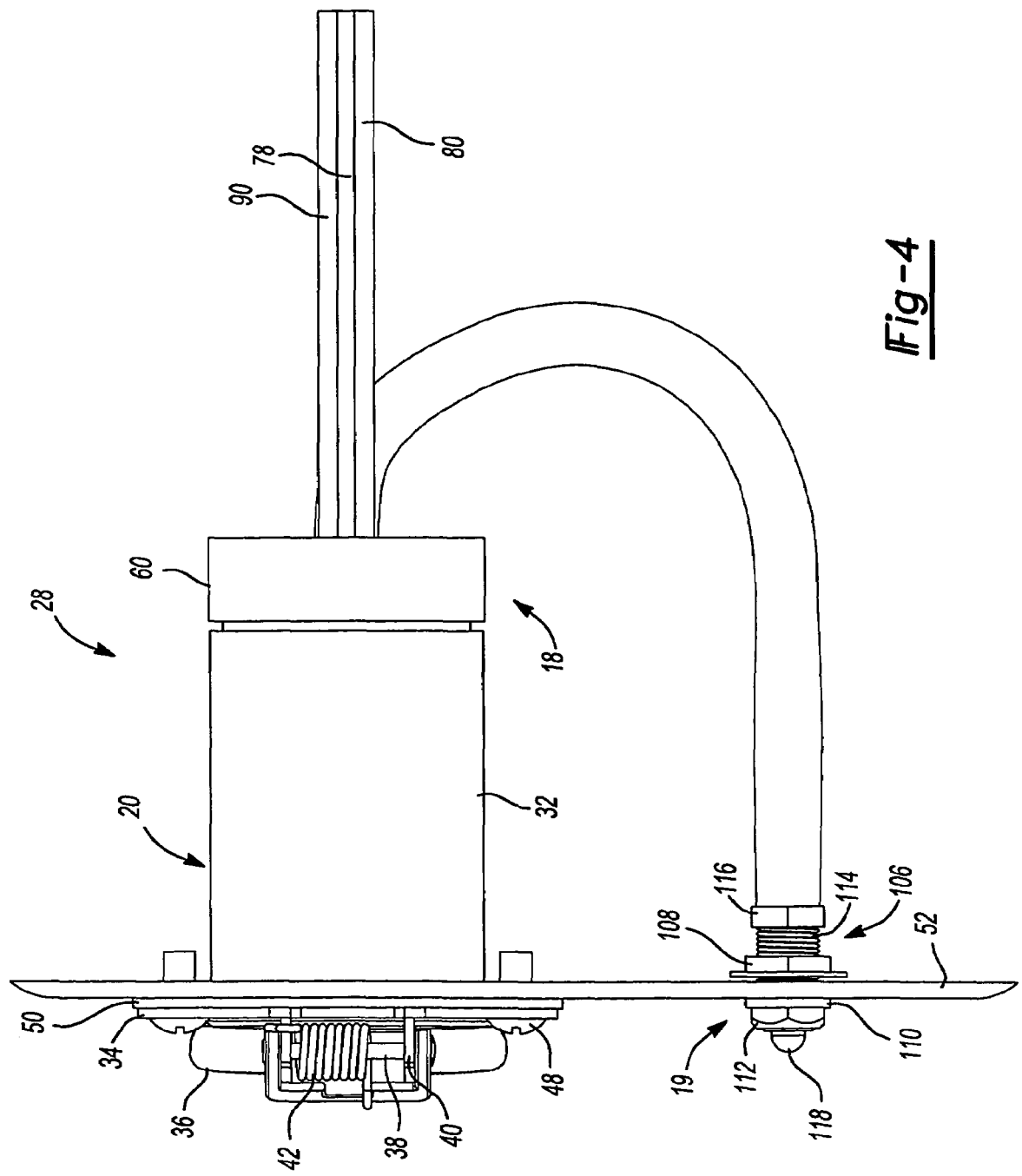
FIG. 4 is a top view showing the electrical indicator system coupled to a vehicle panel.

FIG. 1 depicts a vehicle 6 including an engine 8 and a powered automobile accessory 10, such as an engine block heater. A cord set 12 has a first end 14 electrically connected to the accessory 10 and a second bifurcated end 16. One portion of bifurcated end 16 terminates at a plug 18. The other end terminates at an indicator 19. Plug 18 is coupled to a receptacle 20 that is mounted to the vehicle 6. An auxiliary cord 22 includes a plug 24 for selectively interconnecting cord set 12 to a power source 26 via plug 18. The power source 26 includes an alternating current electrical outlet such as those generally mounted in the walls of building structures.

FIGS. 2-5 depict an electrical indicator system 28 including receptacle 20 and cord set 12 equipped with plug 18 and indicator 19. Receptacle 20 includes a substantially cylindrically-shaped hollow housing 32 coupled to a flange 34. A cap 36 is rotatably coupled to flange 34 via a hinge pin 38. Hinge pin 38 is supported by a pair of upturned stanchions 40 on flange 34. A spring 42 biases cap 36 toward its closed position depicted in FIG. 3. Cap 36 is selectively moveable to an opened position (not shown) rotated about hinge pin 38 ninety degrees or more to allow access to a cavity 44 formed within housing 32. Flange 34 includes a plurality of apertures 46 sized for receipt of fasteners 48. A gasket 50 is constructed from a resilient material and is operable to form a seal between flange 34 and a panel 52 of exemplary vehicle 6. Gasket 50 includes an aperture 54 sized to allow housing 32 to pass therethrough. Gasket 50 includes additional aperture 56 sized and positioned to accept fasteners 48.

Cord set 12 is positioned between panel 52 and automobile accessory 10 and is configured to be easily installed within exemplary vehicle 6. Specifically, the only electrical connection required at installation is between first end 14 and automobile accessory 10. This interconnection method is well known and will not be described in greater detail.

A simple mechanical connection is made to couple plug 18 to receptacle 20. Plug 18 includes a button assembly 58 mounted within a body 60 of plug 18. Button assembly 58 includes a substantially hollow cylindrical cap 62, an axially moveable button 63, a spring 64, and a spring guide 65. Button 63, spring 64 and spring guide 65 are positioned within cap 62. A portion of button 63 extends through an aperture 66 formed in cap 62. Spring 64 is aligned on spring guide 65 and positioned within a recess 67 formed within button 63. This arrangement biases button 63 toward an extended position shown in FIG. 5. Button 63 is axially moveable by overcoming the biasing force provided by spring 64. Accordingly, plug 18 is retained within cavity 44 of housing 32 by initially compressing spring 64 and inserting a reduced diameter portion 68 of plug body 60 into cavity 44. Button 63 is aligned with an aperture 69 extending through housing 32. At this time, spring 64 forces button 63 to extend through aperture 69 and couple plug 18 to housing 32. To further simplify the connection of plug 18 and receptacle 20, body 60 includes an enlarged diameter portion 71 that limits the axial distance body 60 may enter cavity 44.

Plug 18 includes a male live terminal 70, a male neutral terminal 72, and a male ground terminal 74. Each of the terminals 70, 72 and 74 include tabs for electrically coupling wires to each terminal. For example, ground terminal 74 includes a tab 76 in receipt of an end of a ground wire 78. Live terminal 70 is electrically and mechanically coupled to a supply wire 80 via a tab 82. Live terminal 70 is also electrically coupled to one end of a resistor 84. The opposite end of resistor 84 is electrically coupled to a first lead wire 86 of indicator 19.

A tab 88 mechanically and electrically couples a neutral wire 90 to neutral terminal 72. A second lead wire 92 of indicator 19 and a first lead 94 of a current transformer 96 are also electrically coupled to neutral terminal 72. First lead wire 86 and supply wire 80 pass through the current loop formed by current transformer 96. A second lead 98 of current transformer 96 is electrically coupled to a third lead wire 100 of indicator 19. By routing the electrical wires in the manner described and shown in the Figures, a first signal is emitted from indicator 19 when power source 26 is electrically coupled to terminals 70, 72 and 74. In the example shown, indicator 19 is a dual color light-emitting-diode (LED). The first signal corresponds to the LED emitting a green light. If current is flowing through plug 18 such as when accessory 10 is operating, a second signal is emitted from indicator 19. The second signal is a red light emitted from the LED.

Alternatively, the first signal may be a constantly illuminated lamp or LED. The second signal from indicator 19 may be a flashing light. One skilled in the art will appreciate that any number of different visual indications may be emitted from a single indicator 19. These various signals are intended to be within the scope of the disclosure.

Figure 5:
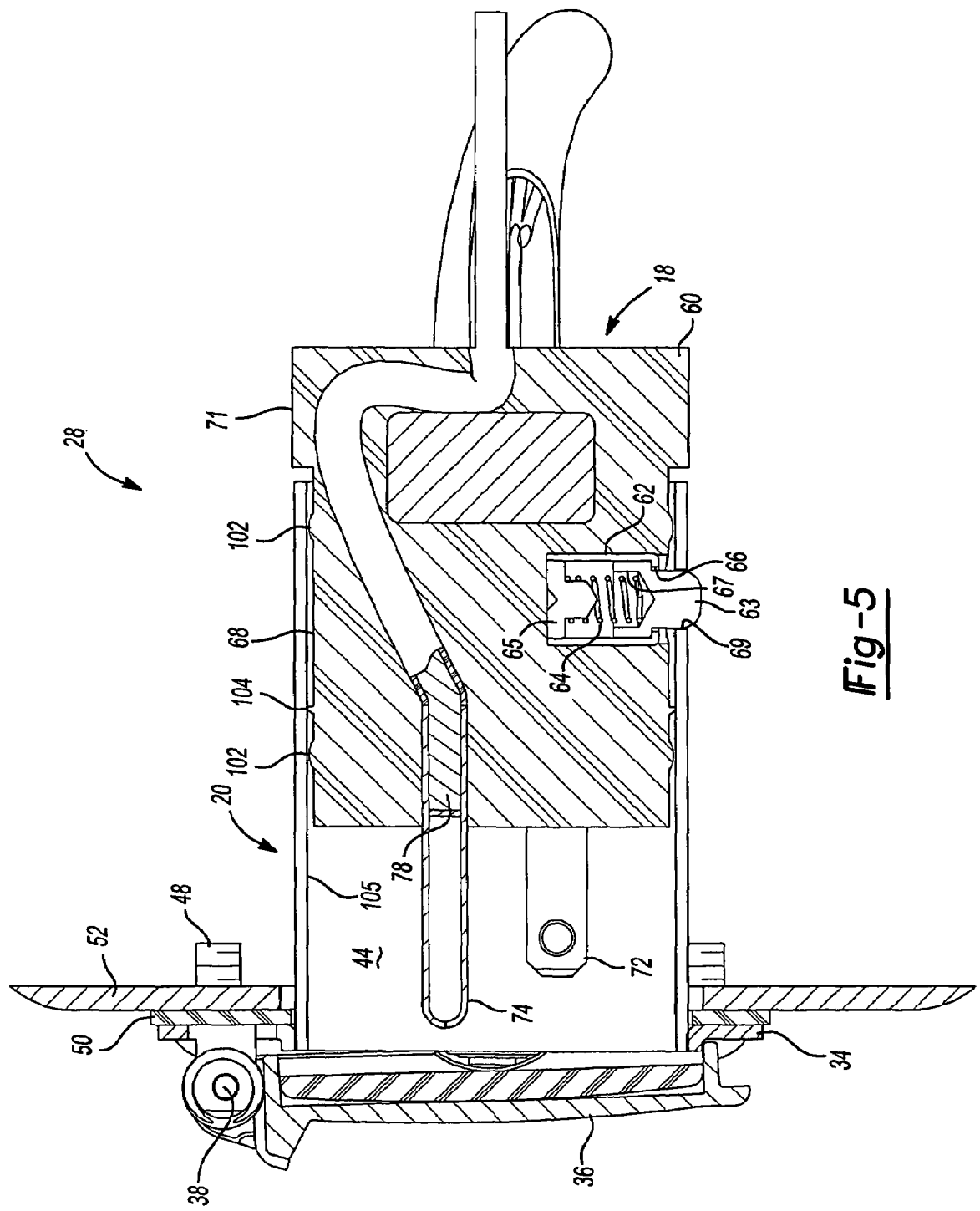
FIG. 5 is a cross-sectional side view of the electrical indicator system.

After terminals, 70, 72 and 74 have been electrically connected to current transformer 96, indicator 19 and wires 78, 80 and 90, each of these components are placed in a mold where molten resin is injected to surround these components and form body 60 of plug 18. Depending on the complexity of the mold, button assembly 58 may also be placed in the mold and over-molded by body 60. Alternatively, button assembly 58 may be mounted to body 60 after the over-molding process has been completed. As shown in FIG. 5, body 60 includes annular protrusions 102 and a seal ring 104 axially spaced from one another and sized to engage an inner surface 105 of housing 32.

Indicator 19 is secured to panel 52 with a threaded housing 106, a first nut 108, a seal 110, and a second nut 112. Housing 106 includes a substantially cylindrically-shaped hollow portion 114 and a radially enlarged portion 116. Portion 116 includes a plurality of flats to allow a tool to engage portion 116 and apply a torque. First nut 108 includes an internal thread threadingly engaging the external thread of portion 114 on threaded housing 106. First nut 108 is axially positioned to allow portion 114 to extend through panel 52. Seal 110 surrounds portion 114 and is positioned between panel 52 and second nut 112. Indicator 19 is positioned at the end of threaded housing 106 such that first, second and third lead wires 86, 92 and 100 extend through housing 106 while a lamp portion 118 of indicator 19 protrudes outwardly from the end of threaded housing 106. Depending on the thickness of panel 52, the axial position of first nut 108 and second nut 112 may be varied to secure indicator 19 to panel 52 and position lamp portion 118 to slightly protrude beyond second nut 112. It should be appreciated that the mounting arrangement and positioning of indicator 19 relative to receptacle 20 is merely exemplary and that it is contemplated that indicator 19 may be mounted in any number of locations on external surfaces of the vehicle or within the passenger cabin.

FIG. 7 depicts another exemplary vehicle 200 equipped with an alternate embodiment electrical indicator system 202. Vehicle 200 is substantially similar to vehicle 6. Accordingly, like elements will retain their previously introduced reference numerals. Electrical indicator system 202 is also substantially similar to electrical indicator system 28. Specifically, electrical indicator system 202 includes a cord set 204 having a first end connected to automobile accessory 10. A second end of cord set 204 terminates at a plug 206 selectively coupled to receptacle 20. The second end of cord set 204 also includes an indicator 208 spaced from receptacle 20. In one embodiment, indicator 208 is mounted to an external surface of vehicle 200. In an alternate embodiment (not shown), indicator 208 may be placed inside the vehicle cabin.

Cord set 204 also includes another electrical branch 210 having an end electrically coupled to an actuator 212. Electrical branch 210 is in communication with the signals being sent to indicator 208. Actuator 212 is one component of an interlock system operable to apply the brakes of the vehicle when a certain signal is received by actuator 212. FIG. 7 depicts actuator 212 mounted to a brake 214. One skilled in the art will appreciate that other interlock systems that restrict the vehicle from being shifted from a "park" gear to a drive gear or other vehicle immobilization systems are contemplated as being within the scope of the present invention.

In operation, actuator 212 receives a signal when plug 24 is electrically coupled to plug 206. At this time, the interlock system operates to restrict vehicle 200 from moving while auxiliary cord 22 is connected to the vehicle. The system operates to eliminate damage to the auxiliary cord 22, the power source 26 and/or vehicle 200 if an operator should attempt to move the vehicle without first disconnecting auxiliary cord 22 from vehicle 200. Once power source 26 no longer provides power to plug 206, actuator 212 is deactivated and the interlock system releases the brakes to allow the vehicle to operate normally.

Figure 8:
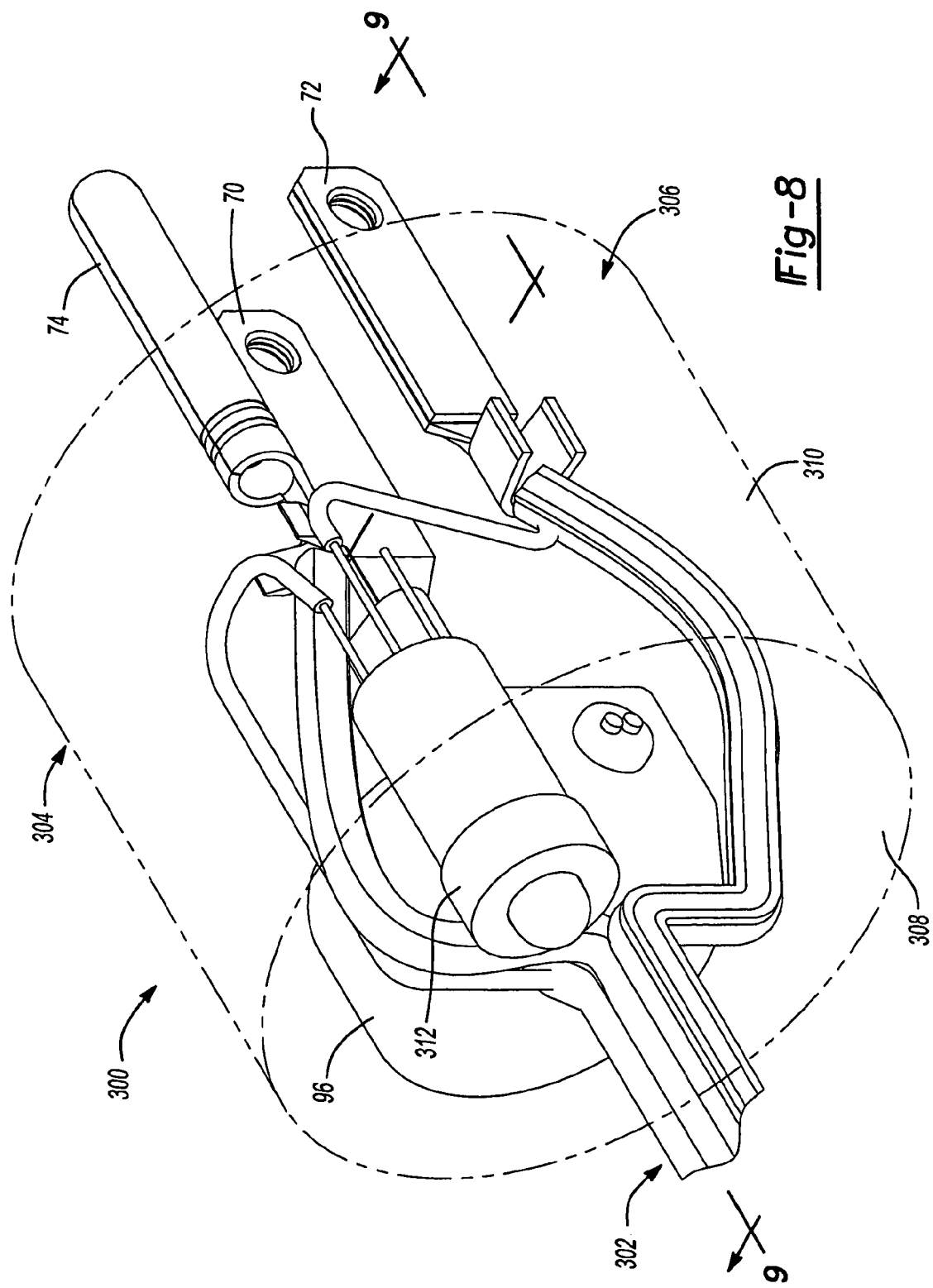
FIG. 8 is a fragmentary perspective view of an alternate embodiment electrical indicator system having a visual indicator mounted within the electrical plug.
Figure 9:
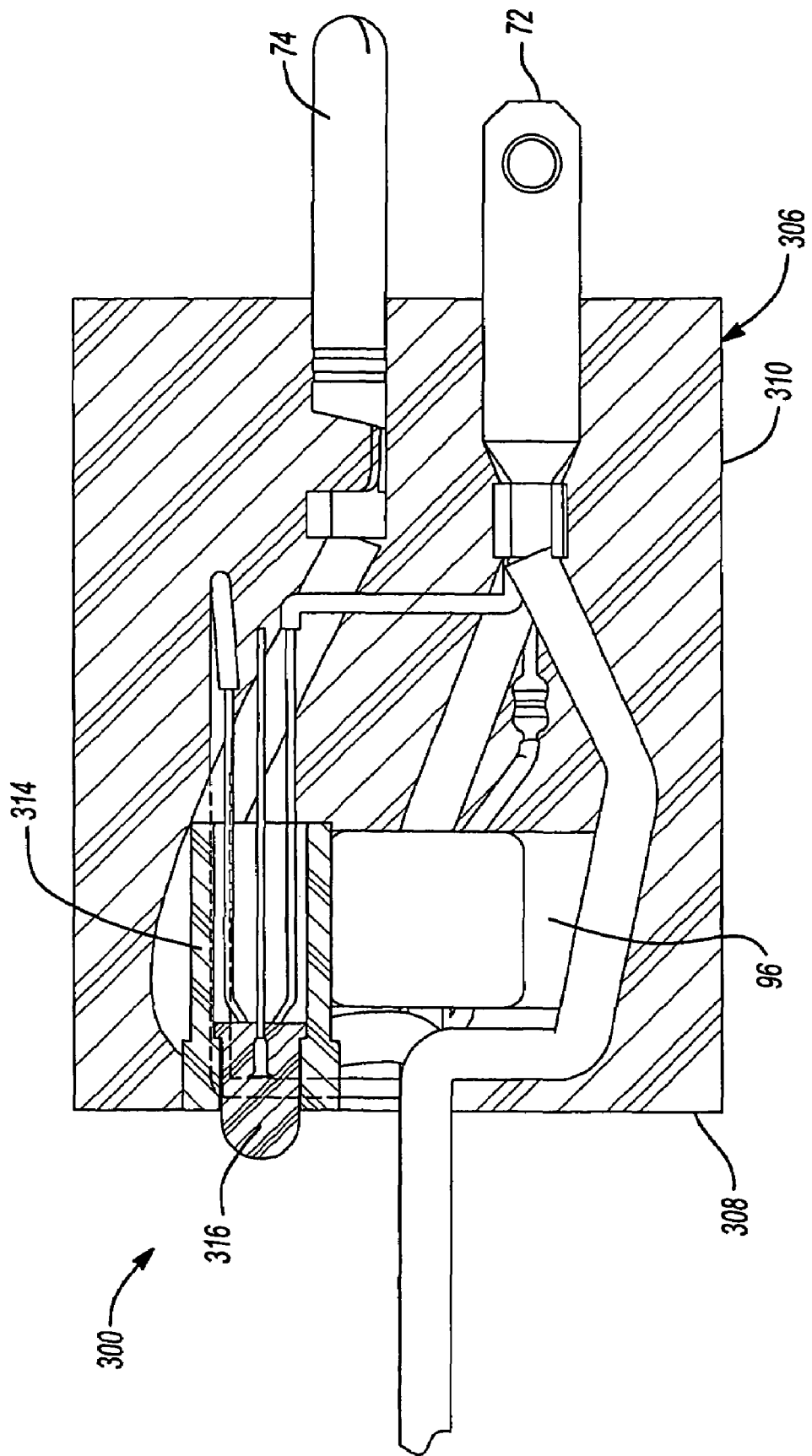
FIG. 9 is a cross-sectional view taken along line 9-9 shown in FIG. 8.
Figure 10:
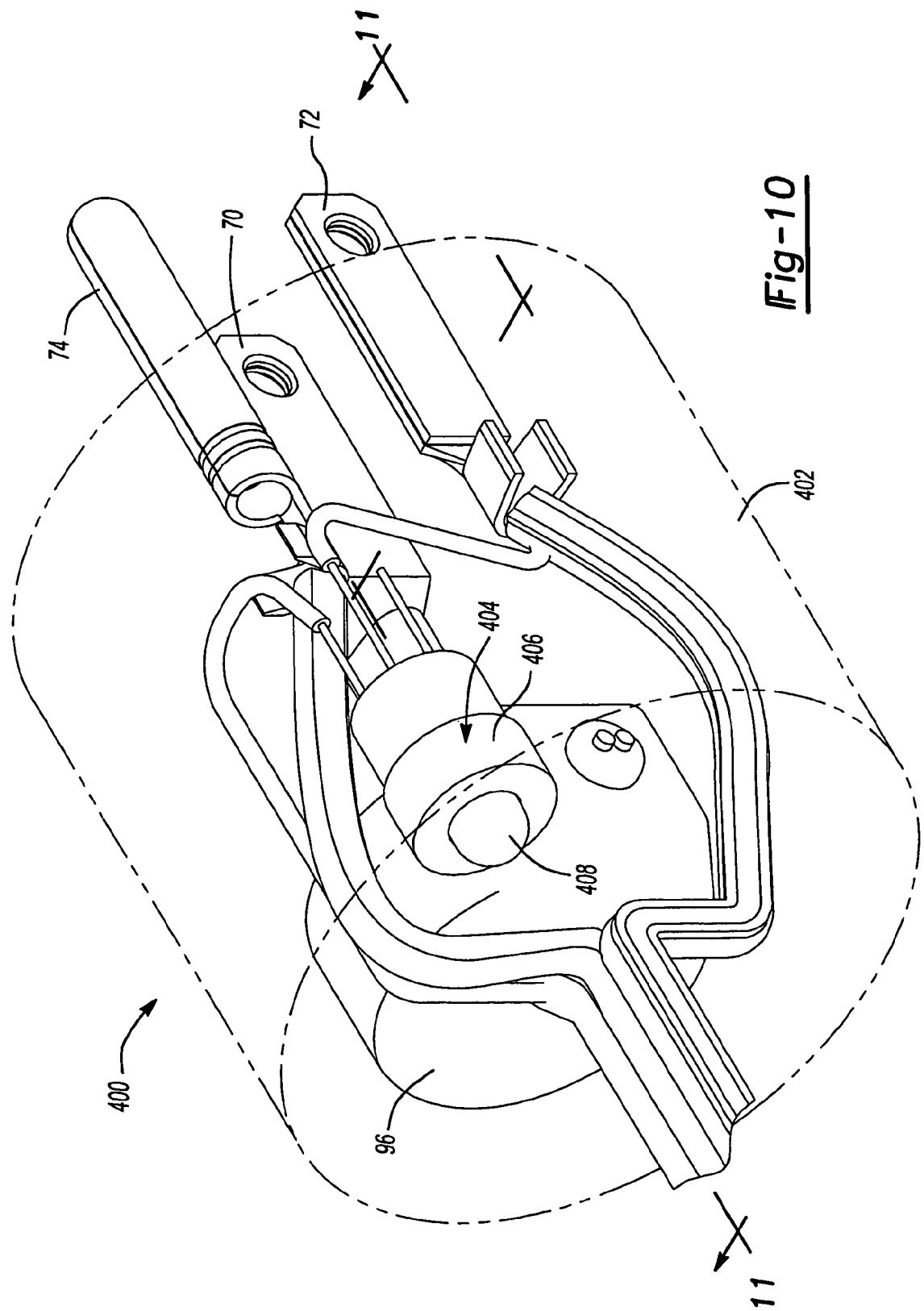
FIG. 10 is a fragmentary perspective view depicting another alternate embodiment electrical indicator system having a visual indicator embedded within a translucent plug body.

FIGS. 8-10 show another alternate embodiment electrical indicator system identified at reference numeral 300. Electrical indicator system 300 is substantially similar to electrical indicator system 28 except that indicator 19 is no longer spaced apart from plug 18. Like elements will retain their previously introduced reference numerals. Electrical indicator system 300 includes a cord set 302 having a first end (not shown) connected to automobile accessory 10 and a second end 304 terminating at a plug 306. Plug 306 is removably mounted to a portion of a vehicle (not shown) such as a grill or bumper. To provide power to automobile accessory 10, a user may move plug 306 a relatively small distance from its mount on the bumper or grill to connect plug 306 to an external power source. As such, plug 306 may or may not be permanently mounted within a receptacle as depicted in FIG. 1. In particular, it is envisioned that a user will have visual access to an end face 308 of a plug body 310.

Plug body 310 supports male live terminal 70, male neutral terminal 72 and male ground terminal 74. In addition, an indicator 312 is supported by body 310 and partially extends from end face 308. Indicator 312 is substantially similar to indicator 19. Furthermore, indicator 312 is electrically connected to current transformer 96 and the male terminals as previously described.

Indicator 312 includes a housing 314 and a lamp 316. Housing 314 is an optional component used to position lamp 316 such that a portion of lamp 316 extends rearwardly beyond end face 308. Housing 314 may be eliminated if tooling exists to properly position lamp 316, current transformer 96 and male terminals 70, 72 and 74 within a mold cavity while molten material is over-molded around these components to form body 310.

Indicator 312 operates substantially similarly to indicator 19 in that the single indicator is operable to emit a first signal when power is electrically coupled to terminals 70, 72 and 74. A second signal is emitted from indicator 312 when current is flowing through plug 306.

Figure 11:
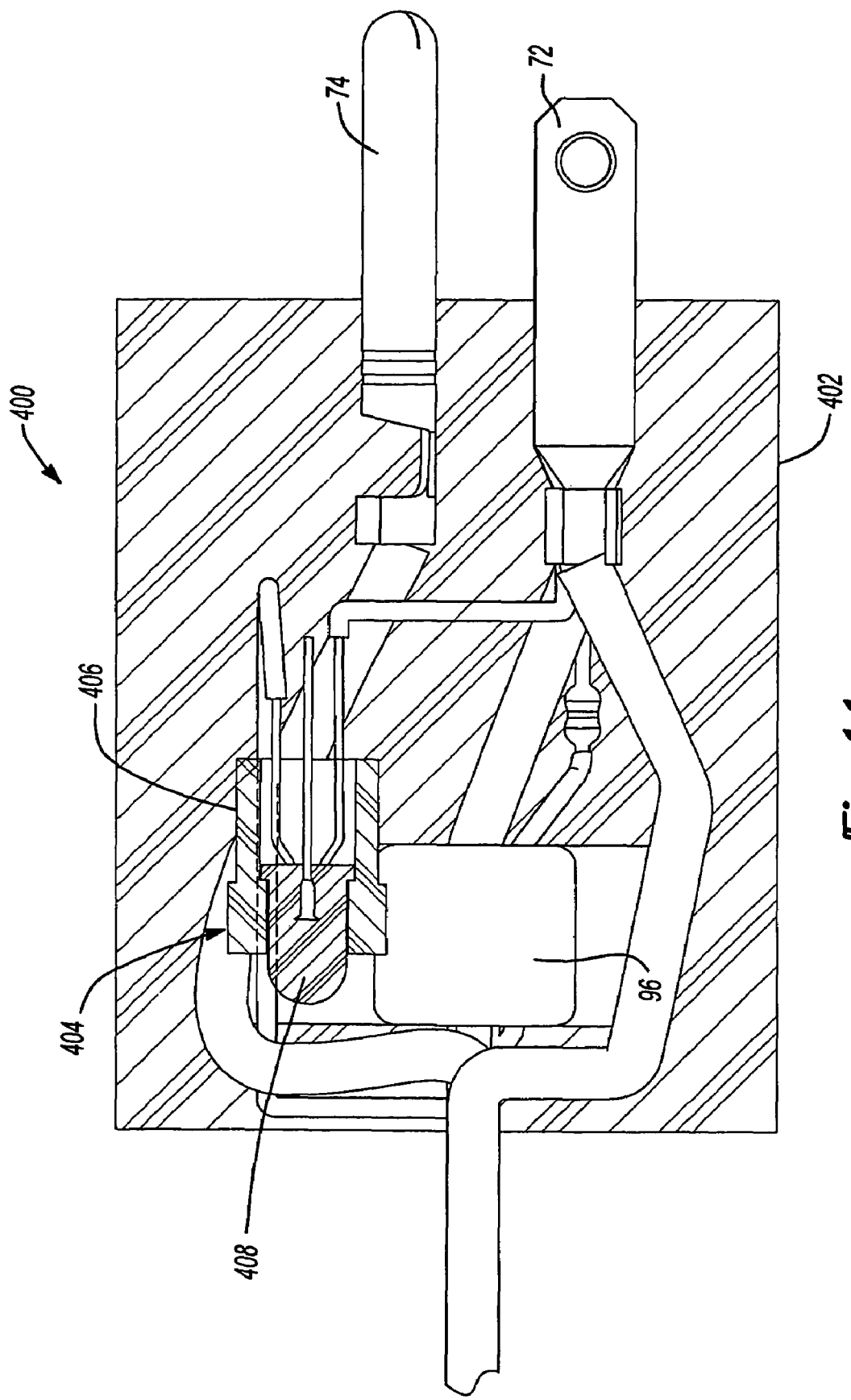
FIG. 11 is a cross-sectional view of the electrical indicator system taken along line 11-11 as shown in FIG. 10.

FIGS. 11 and 12 depict another alternate embodiment electrical indicator system 400. Electrical indicator system 400 is substantially similar to electrical indicator system 300. Accordingly, like elements will retain their previously introduced referenced numerals. Electrical indicator system 400 includes a plug body 402 constructed from a clear or translucent material. An indicator 404 is embedded within body 402. Indicator 404 is operable to selectively emit first and second visual signals similar to the signals previously described. Because body 402 is translucent, light emitted from indicator 404 will pass through body 402 to provide the visual signals to an operator.

Indicator 404 includes an optional housing 406 operable to position a lamp 408 within body 402. Depending on the methods utilized to form body 402, housing 406 may be eliminated.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. An electrical indicator system for use with an accessory mounted to a vehicle, the indicator system comprising:
   a plug adapted to be electrically coupled to a power source remote from the vehicle; and
   an indicator in electrical communication with the plug, the indicator being adapted to be mounted to the vehicle at a visible location, the indicator being operable to provide a first visual indication when electrical power is present at the plug and a second visual indication, different from the first visual indication, when current is flowing through the plug.

2. The electrical indicator system of claim 1 further including a current transformer electrically coupled to the plug, the current transformer being operable to provide an electrical output to the indicator.

3. The electrical indicator system of claim 2 wherein the indicator includes a dual color light emitting device.

4. The electrical indicator system of claim 3 wherein a first colored light is emitted from the dual color light emitting device as the first visual indication and a second colored light is emitted from the dual color light emitting device as the second visual indication.

5. The electrical indicator system of claim 4 wherein the light emitting device includes a light emitting diode.

6. The electrical indicator system of claim 2 wherein the plug includes terminals electrically coupled to the current transformer where the current transformer and the terminals are positioned within a one-piece molded body and a portion of each terminal extends outwardly from the body.

7. The electrical indicator system of claim 6 wherein the indicator is spaced apart from the body.

8. The electrical indicator system of claim 1 further including a receptacle adapted to be mounted to the vehicle, the plug being removably coupled to the receptacle.

9. The electrical indicator system of claim 8 wherein the plug includes a button in biased engagement with the receptacle.

10. The electrical indicator system of claim 9 wherein the button is positioned within an aperture extending through a sidewall of the receptacle when the plug is coupled to the receptacle.

11. The electrical indicator system of claim 8 wherein the receptacle includes a hollow substantially cylindrical housing and a selectively rotatable cover coupled to the housing.

12. The electrical indicator system of claim 11 wherein the plug includes a radially extending flange positioned at an end opposite the terminals, the flange being operable to limit the axial distance the plug is allowed to enter the housing.

13. The electrical indicator system of claim 1 further including a cord having a bifurcated first end terminating at the plug and at the indicator, the cord having a second end adapted to be electrically coupled to the accessory.

14. The electrical indicator system of claim 1 further including an interlock system operable to restrict movement of the vehicle if power is present at the plug.

15. A vehicle in combination with an electrical indicator system comprising:
 an electrically powered accessory mounted to the vehicle;
 a receptacle mounted to the vehicle; and
 an electrical indicator system having a first end electrically coupled to the accessory and a second end having terminals mounted in a plug, the plug being coupled to the receptacle wherein selective access to the terminals is provided for connection to an external power source, the electrical indicator system further including an indicator in electrical communication with the terminals, the indicator being operable to provide a first visual indication when power is being provided to the terminals by the external power source and a second visual indication when current is flowing to the accessory.

16. The vehicle and electrical indicator system combination of claim 15 further including a current transformer electrically coupled to the plug, the current transformer being operable to provide an electrical output to the indicator.

17. The vehicle and electrical indicator system of claim 16 further including a resistor electrically coupled to the current transformer and the indicator.

18. The vehicle and electrical indicator system of claim 16 wherein the indicator includes a dual color light emitting diode having first, second and third leads, wherein the first lead is electrically coupled to one of the terminals and one lead of the current transformer, the second lead is electrically coupled to another one of the terminals, and the third lead is electrically coupled to the other lead of the current transformer.

19. The vehicle and electrical indicator system of claim 16 wherein the terminals and the current transformer are at least partially positioned within a one-piece molded body.

20. The vehicle and electrical indicator system of claim 15 wherein the plug includes a button in biased engagement with the receptacle.

21. The vehicle and electrical indicator system of claim 20 wherein the button is positioned within an aperture extending through a sidewall of the receptacle when the plug is coupled to the receptacle.

22. The vehicle and electrical indicator system of claim 15 wherein the indicator is mounted on an external surface of the vehicle.

23. The vehicle and electrical indicator system of claim 15 further including an interlock system operable to restrict movement of the vehicle if power is present at the plug.

24. An electrical indicator system for use with an electrically powered accessory mounted to a vehicle, the indicator system comprising:
 a cord having a first end adapted to be electrically coupled to the accessory and a second end having a plug, the plug being adapted to be electrically coupled to a power source remote from the vehicle; and
 an indicator being mounted to and in electrical communication with the plug, the indicator being operable to provide a first visual indication when electrical power is present at the plug and a second visual indication, different from the first visual indication, when current is flowing through the plug.

25. The electrical indicator system of claim 24 further including a current transformer electrically coupled to the plug, the current transformer being operable to provide an electrical output to the indicator.

26. The electrical indicator system of claim 25 wherein the plug includes terminals electrically coupled to the current transformer, the current transformer, the indicator and the terminals being at least partially positioned within a one-piece molded body.

27. The electrical indicator system of claim 24 wherein the indicator includes a dual color light emitting device.

28. The electrical indicator system of claim 24 wherein the indicator is embedded within a molded body of the plug, the plug body being translucent.

29. A method of indicating external power availability and usage to an operator of a vehicle having an electrical accessory mounted to the vehicle, the vehicle being equipped with a cord set having a first end electrically connected to the accessory and a second bifurcated end having a plug coupled to an externally accessible receptacle and an indicator, the method comprising:
 electrically coupling an external power source to the plug;
 emitting a first visual signal to indicate that power is being supplied to the plug;
 selectively operating the accessory; and
 emitting a second visual signal during operation of the accessory to indicate that power is being supplied to the accessory.

30. The method of claim 29 wherein the first and second visual signals are emitted from an external surface of the vehicle.

31. The method of claim 29 wherein the second visual signal is emitted to indicate that current is flowing through the plug.

32. The method of claim 29 further including restricting movement of the vehicle when power is present at the plug.

33. The method of claim 29 wherein the first and second visual signals are emitted from a single light emitting device.

* * * * *